United States Patent [19]

Crane et al.

[11] E Re. 29,765

[45] Reissued Sep. 19, 1978

[54] STRAIN GAUGE TRANSDUCER SYSTEM

[75] Inventors: Hewitt D. Crane, Portola Valley; Jon C. Taenzer, Palo Alto; Gerry B. Andeen, Menlo Park, all of Calif.

[73] Assignee: SRI International, Menlo Park, Calif.

[21] Appl. No.: 844,276

[22] Filed: Oct. 21, 1977

Related U.S. Patent Documents

Reissue of:

[64] Patent No.: 3,915,015
Issued: Oct. 28, 1975
Appl. No.: 451,846
Filed: Mar. 18, 1974

[51] Int. Cl.[2] ..... G01L 5/16

[52] U.S. Cl. ..... 73/432 R; 73/133 R

[58] Field of Search ..... 73/133 R, 432 R, 141 A, 73/189; 340/146.3 SY

[56] References Cited

U.S. PATENT DOCUMENTS

| | | | |
|---|---|---|---|
| 2,848,892 | 8/1958 | Hoffman | 73/141 A |
| 3,023,627 | 3/1962 | Geyling | 73/517 R |
| 3,270,260 | 8/1966 | Mehr | 73/133 R X |
| 3,341,794 | 9/1967 | Stedman | 73/720 X |
| 3,528,295 | 9/1970 | Johnson et al. | 73/432 R |
| 3,832,895 | 9/1974 | Strandh | 73/133 R |

*Primary Examiner*—Charles A. Ruehl

[57] ABSTRACT

A writing instrument is provided which generates electrical signals indicative of the force applied and the direction of motion taken by the writing instrument as one is writing with it. The writing instrument uses strain gauges for providing these signals.

9 Claims, 9 Drawing Figures

STRAIN GAUGE TRANSDUCER SYSTEM

Matter enclosed in heavy brackets [ ] appears in the original patent but forms no part of this reissue specification; matter printed in italics indicates the additions made by reissue.

BACKGROUND OF THE INVENTION

This invention relates to a writing instrument which generates signals representative of the force applied and the direction of motion taken in writing, and more particularly to improvements therein.

In a U.S. Pat. No. 3,145,367, there is described and claimed a pen which uses switches to generate signals when used in writing, which indicate the direction which is being written. A specific sequence of direction signls are used to sequence a specific one out of many magnetic core shift registers. The last stage or last magnetic core in the shift register, when actuated, indicates the character which has been written.

In an application for "Handwriting System", by Crane, et al., which is assigned to this assignee, filed Jan. 31, 1974, Ser. No. 438,413, (Attorney's Docket No. 73/341), there is described a pen which, instead of quadrantially placed switches for indicating direction of motion, uses quadrantially placed photodiodes, actuated by a light on the ink cartridge of the pen, to generate signals which are subsequently used for identifying the characters which have been written with the pen.

The use of photodiodes for generating pen motion signals is an improvement over the switches, in that switch contacts corrode or oxidize, or wear with use, which is a problem that does not affect the photodiodes. A pen with photodiodes for generating direction signals works effectively. However, if a pen signal generating system could be devised which not only provides direction signals but also can provide a signal indicative of the pen to paper force being used while writing, another dimension would be provided for enabling the accomplishment of character recognition from the output of a pen. One further problem that arises, is that the use of switches and photodiodes cause the pen to be somewhat bulky and therefore cumbersome to handle. If a system could be devised which could reduce the size and weight of the components used in the pen for generating signals, it would enable one to write more normally with the pen than is the case when the pen is cumbersome to hold and manipulate.

OBJECTS AND SUMMARY OF THE INVENTION

An object of this invention is to provide a pen of the type briefly described, which can simultaneously generate signals indicative of the direction of motion of the pen as well as the amount of pressure being used.

Another object of this invention is the provision of a pen, of the type described, wherein the signal generating elements are more conveniently and compactly assembled within the pen than in previous arrangements.

Yet, another object of the invention is the provision of a novel and useful three dimensional transducer system.

These and other objects of the invention may be achieved by an arrangement wherein, for example, the ink cartridge within a ballpoint pen, is supported by means of a flexible diaphragm. At strategic locations on the diaphragm there are attached thin film strain gauges. The diaphragm twists and bends as the pen is used for writing. The strain established within the diaphragm responsive to the motion of the ballpoint pen causes the strain gauges to generate signals in response thereto, which are combined to provide direction of motion signals as well as the amplitude of the force being applied at the time.

Figure 8:
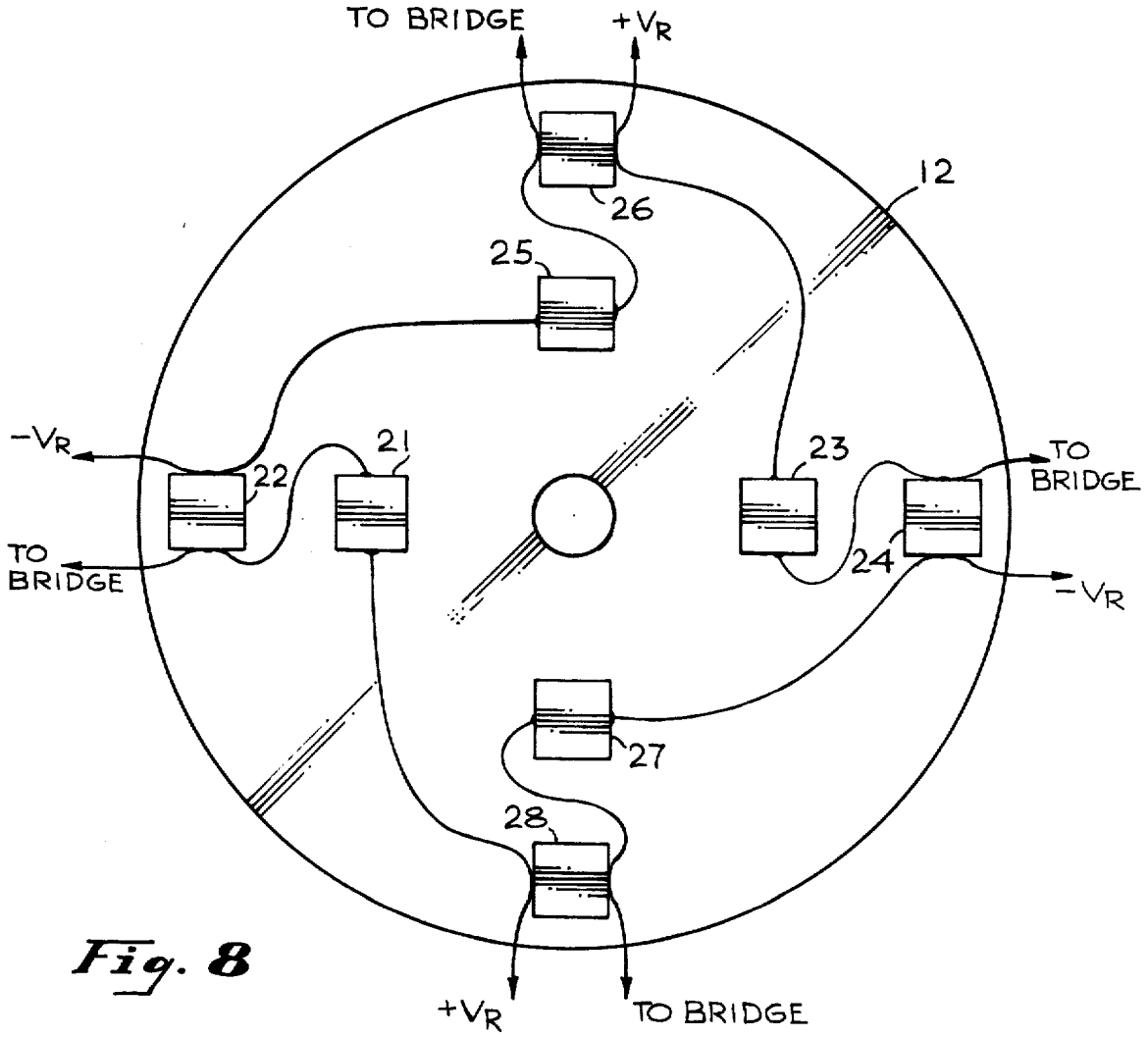

And, FIG. 8 illustrates strain gauge placement on a diaphragm, which is a preferred arrangement.

DESCRIPTION OF THE PREFERRED EMBODIMENTS

Figure 1:
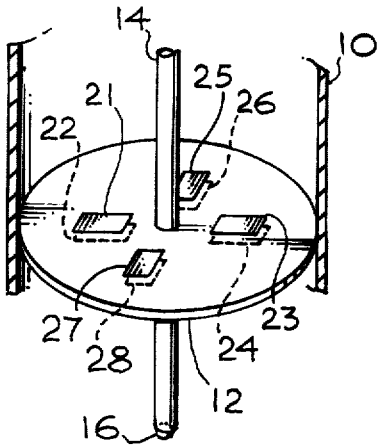
FIG. 1 is a cross-sectional and fragmentary view illustrating an embodiment of the invention, in accordance with this invention.

FIG. 1 is an enlarged cross-sectional view of the writing end of a pen, in accordance with this invention. A "housing" 10 has a flexible diaphragm 12, securely mounted by its periphery therein. An ink cartridge 14, which holds a writing ball 16 at the end extending outside of the barrel, is rigidly attached to the center of the diaphragm 12.

Mounted on the diaphragm, around the region through which the pen cartridge passes, are four pairs of strain gauges respectively bearing reference numerals 21, 22, 23, 24, 25, 26, 27, and 28. The strain gauges are mounted opposite one another and on opposite sides of the diaphragm. Those on the bottom side of the diaphragm are represented by the dotted lines. The disposal of the strain gauges may be considered as being along lines forming coordinate axes intersecting the center of the diaphragm.

Figure 2A:
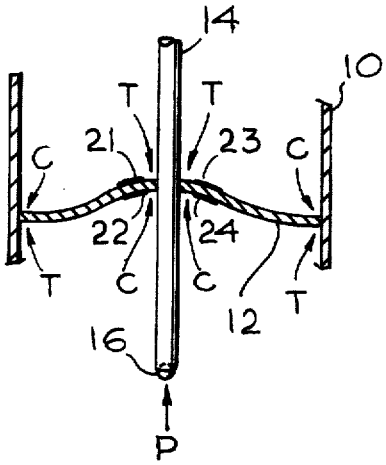
FIGS. 2A and 2B are views in section, illustrating strain gauge deflection in response to writing forces.
Figure 2B:
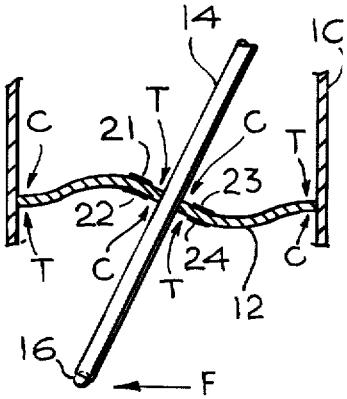

FIGS. 2A and 2B respectively indicate the flexure of the diaphragm when the ballpoint cartridge is pushed down against the paper and when one writes so that the ballpoint cartridge is deflected to the left. The distribution of forces in each case is indicated by the letter C (for compression) and T (for tension). The forces applied to the ballpoint are represented as F and P. An analysis of strains in FIG. 2A will show that the strains are greatest near the center of the diaphragm and decrease in magnitude reversing in polarity as one moves from the center of the diaphragm to the outer wall. Also, the distribution of strains is reversed on the upper and lower surfaces of the diaphragm. In particular, the strain is zero somewhere along the radius (on both surfaces), which means that for maximum effect the strain gauges should be mounted either close to the pen point or close to the outer wall. The strains are actually greater near the center. In FIG. 2A it will be seen that the top part of the diaphragm near the center is under tension while the portion of the diaphragm immediately underlying this region is under compression. As one progresses to the outside of the diaphragm the strain changes from compression to tension or from tension to compression as illustrated.

In FIG. 2B, with a force deflecting the pen to the left, the top part of the diaphragm to the left of the ballpont cartridge is in tension while the portion of the diaphragm immediately underlying this portion is in compression. In the region of the diaphragm to the right of the ballpoint cartridge, the top part of the diaphragm is in compression while the region underlying it is in tension. Thus, in this case, there is a polarity change as one moves in a circle around the center of the diaphragm. With a lateral force to the right, the reverse tension and compression forces would be applied to the diaphragm to that shown in FIG. 2B.

The effect of tension and compression is to change the amplitude of the strain gauge resistance; the change in resistance is essentially linear with the magnitude of the force. Over the normal range of operation, the magnitudes of compression and tension in opposing gauges is nominally equal.

Figure 3:
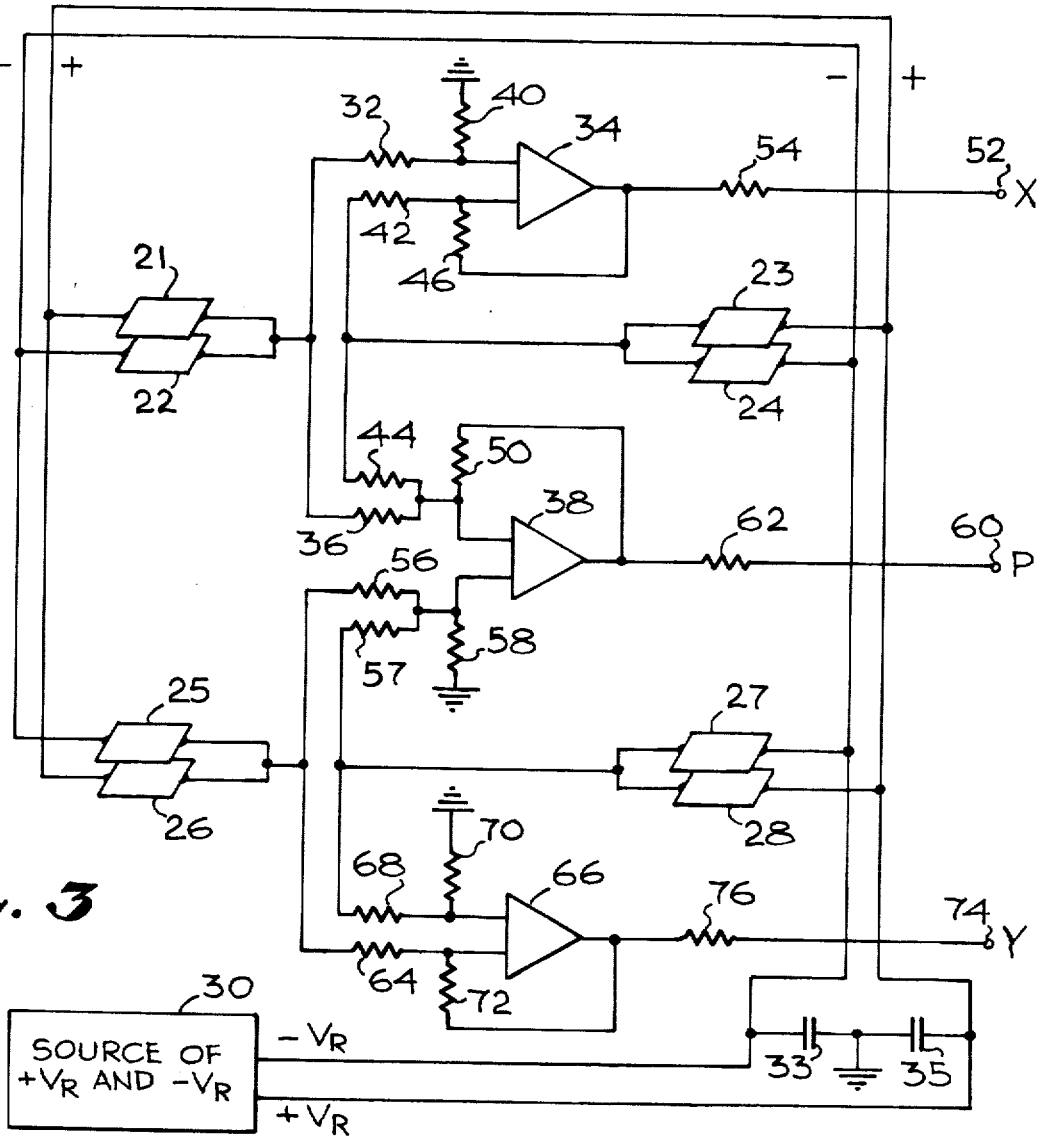
FIG. 3 is a circuit diagram, illustrative of the bridge circuit to which the strain gauges are connected whereby the direction and pressure signals are produced.

To distinguish between lateral forces X and Y, and vertical force P, the strain gauges shown in FIG. 1 are interconnected into a multiple bridge circuit arrangement, as shown in FIG. 3. A regulated voltage source 30, designated as source of $+V_R$ and $-V_R$, provides the output voltages $-V_R$ and $+_R$. These are connected to two bus lines. Across these two bus lines are connected two capacitors 33, 35, which have an equal value, and whose center point is grounded. $+V_R$ is connected to one terminal of the two terminal strain gauges respectively designated by reference numerals 21, 23, 26, and 28. The $-V_R$ bus is connected to one terminal of the respective strain gauges 22, 24, 25, and 27. The other terminals of strain gauges 21, and 22 are connected to a line which extends through a first resistor 32 to one input to a differential amplifier 34. The other end of this line extends through a resistor 36, to one input of another differential amplifier 38. The side of resistor 32 which is connected to the differential amplifier 34 is connected to ground through another resistor 40.

Strain gauges 23 and 24, have their other ends connected together and to a line which has one end connected together and to a line which has one end connected through a resistor 42 to the other input to amplifier 34. The other end of this line is connected through a resistor 44 to the same input to the amplifier 38 as the one to which the resistor 36 is connected. A feedback resistor 46 is connected between the output of the amplifier 34 and the input to which the resistor 42 is connected. A feedback resistor 50, is connected between the output of the amplifier 38 and the input to which the resistors 36 and 44 are connected. The output of the differential amplifier 34 is applied to an output terminal 52 through a resistor 54. This output is a signal indicative of motion in one direction, here designated as X.

The other side of the strain gauges 25 and 26 are connected to a line, one side of which is connected through a resistor 56 to the differential amplifier 38. This differential amplifier input is also connected to ground through a resistor 58. The output of the differential amplifier 38 is applied to an output terminal 60, through a resistor 62. The signal at the output terminal 60 is proportional to the upward force on the diaphragm as the pen is pushed against the paper.

The other end of the line connected to the strain gauges 25 and 26 is connected through a resistor 64 to one input of an operational amplifier 66. The other end of the line connected to the strain gauges 27 and 28 is connected through a resistor 68 to a second input to the differential amplifier 66. This second input is connected to ground through a resistor 70. Feedback from the output of the differential amplifier 66 to the input to which the resistor 64 is connected is made through a resistor 72. The output of the differential amplifier 66 is connected to a terminal 74 through a resistor 76. The output at the terminal 74 is representative of motion orthogonal to motion X represented by output appearing at the terminal 52 and is designated by the letter Y.

From the foregoing, it will be seen that what is provided by this invention is a three dimensional force transducer which provides signals indicative of direction of force or motion in a plane and the force applied to that plane via the transducer. From the foregoing description, it will be seen that the X output derives from the voltage difference existing between strain gauge pairs 21 and 22 and 23 and 24 which are on opposite sides of the center of the diaphragm and along a line extending therethrough. The Y output is derived from the voltage difference existing between strain gauge pair 25 and 26 and pair 27 and 28 which are on opposite sides of the center of the diaphragm and along a line orthogonal to the first line at the center of the diaphragm. Vertical force output may be obtained directly from the sum of the 21, 22, and 23 and 24 outputs or from the sum of the 25, 26 and 27, 28 outputs. By arranging the bridge so that these two sums move in opposite directions (with an applied force P), they are added directly in a differential amplifier so that all four pairs of gauges contribute equally to the vertical force signal, P. Where there is no force on the pen point, all bridges are balanced and the output of all amplifiers is nominally zero.

In the situation represented in FIG. 2 (A), in response to vertical force, the 21, 22 and 23, 24 strain gauge outputs move together (by the same amount and direction). Since these outputs are added for P and subtracted for X, a pressure output is signaled, but there is nominally no output change in X (or Y). A P force (the vertical component of the contact force in writing), affects gauge pairs 25, 26 and 27, 28 by the same amount as pairs 21, 22 and 23, 24. However, the bridges are arranged so that the signals generated by pairs 25, 26 and 27, 28 are opposite in polarity to those generated by pairs 21, 22 and 23, 24. These opposite polarity signals are in effect added by the opposite polarity inputs to the differential amplifier 38 whose output is P.

In the situation shown in FIG. 2 (B), movement of the pen tip to the left, the 21, 22 and 23, 24 strain gauge outputs change by the same magnitudes but in opposite directions. In this case, a negative X output is signaled but there is no change in P (or Y). If the motions of FIGS. 2 (A and B) are combined, there is a change in both X and P, (but not Y). It can be seen then that there is nominally perfectly isolation between X, Y and P with an eight strain gauge arrangement as shown.

Two of the most important aspects considered in the design of a pen, in accordance with this invention, are sensitivity and reliability. Properly designed and utilized foil strain gauges are quite reliable, but they are not very sensitive in converting strain into an electrical signal, and therefore bride circuits are required. Although other strain transducers, (semiconductor, piezoelectric, etc.) are available, some with higher sensitiviies, each has certain drawbacks which at present make them less suited for this application. A measure of sensitivity that is important for the pen, however, is not just the electrical sensitivity to strain, but rather the electrical sensitivity to the forces at the pen tip. This overall sensitivity is the product of the bridge sensitivity, the gauge sensitivity, and the mechanical (force-to-strain) sensitivity of the diaphragm.

The maximum strain for both X-Y and vertical forces at the pen tip is inversely proportional to the diaphragm thickness squared, and inversely related to the radii in a more complicated way. Since the radii are selected for size considerations, the primary control on the mechanical sensitivity is the diaphragm thickness. Large mechanical sensitivity requires that the diaphragm be made of a material with a low modulus of elasticity, yet the material must also have high yield strength in order to be able to withstand relatively large peak forces (such as vigorously dotting an i) without permanent deformation. There are a number of materials which meet these requirements; aluminum, for example, is readily available, easily machined, and has high heat conductivity, thus helping to keep all gauges at the same temperature. The maximum sensitivity is controlled by the elastic limit of the material; the limiting strain being the strain at the yield point. If the pen is designed so that the maximum force to be encountered at the pen tip produces this limiting strain in the diaphragm, the maximum sensitivity is reached.

Placement of the strain gauges is another important factor. The diaphragm can be approximated for analytical purposes by a perforated disc clamped at the inner and outer edges. Maximum stress occurs in the radial direction for both torque (X-Y) and in line (pressure) deflection of the diaphragm. This radial stress is at an absolute maximum at the inner edge of the perforated disc and decreases and changes sign toward the outer edge. The ratio of the absolute radial stresses at the inner and outer radii is roughly inversely proportional to the ratio of the radii. For greatest sensitivity, it is desired to place the strain gauges in the regions of greatest stress (and hence strain) consistant with other constraints and as the size of the gauge and ability to maintain temperature. Thus, gauges should be placed as close as practical to the inner or outer radii but should not be placed near the average radii.

X and Y forces produce stresses and strains in the diaphragm in proportion to the length of the moment arm from the diaphragm to the pen tip. The response of the gauges to vertical force P, however, is independent of the moment arm. Thus, the relative sensitivity to forces between the X-Y and vertical directions can be conveniently controlled by the pen nib length. The relative sensitivity can also be controlled by selection of the diaphragm outside and inside dimensions although this is not so attractive since the desired diaphragm size is small.

The relative sensitivity should be much greater for the X-Y forces than for the vertical forces since the vertical forces are considerably larger. This is an advantage for the configuration holding the diaphragm in a plane parallel to the writing surface; the sensitivities can then be adjusted to the maximum levels for the directions. A pen in which the diaphragm is normal to the handle (barrel and handle are aligned) can be built. Resolution of the forces relative to the pen to those relative to the writing surface (and used in the character recognition algorithm) could be made if the angle of the handle were a known value. Such resolutions may involve some loss in resolution in the forces resolved in the plane parallel to the paper since the X-Y diaphragm sensitivity may have to be decreased to achieve the necessary strength.

Natural mechanical resonant frequencies should preferably be well above the highest frequency components of the signals generated during writing. It is also desirable to have the pen tip mounted rigidly so that the writer does not notice the displacement of the pen tip under writing conditions. Since the natural frequencies of vibration (and inversely the deflection of the pen tip) are proportional to the cube of the diaphragm thickness, these considerations can be important in determining thickness of the diaphragm. Due to the very low moving mass of the diaphragm and pen tip, these constraints are not controlling factors. They can become important should the radius of the diaphragm get large or the pen cartridge get long. However, in a pen design these can be adequately controlled.

Because of the low-level signals from the gauges, inductive and electrostatic "noise" pickup may be of concern, this can be nullified using standard techniques for reducing noise pickup such as by twisting wires whereby the differential amplifier configuration causes cancellation since the pickup in a pair of twisted wires is of equal amplitude.

FIGS. 4 through 7 illustrate arrangements wherein the total number of strain gauges required and therefore the complexity of the instrument is reduced. The number of gauges is reduced from 8 to 4. Each drawing shows a diaphragm with the gauges placed thereon. Those gauges on top of the diaphragm bear reference numerals corresponding to the ones applied to the gauges on top of the diaphragm in FIG. 1. Those gauges on the bottom side of the diaphragm have reference numerals applied which correspond to the gauges on the bottom side of the diaphragm and to the location shown in FIG. 1. In each drawing, adjacent each diaphragm with the strain gauges shown thereon is shown a simplified schematic arrangement of a bridge circuit which can be used with the placement of the gauges shown, to produce X, Y and P signals. In all of the arrangements shown in FIGS. 4 through 7 of the drawings, half of the gauges are replaced by fixed resistors. In all of these schemes, except for the arrangement shown in FIG. 7, sensitivity is cut in half. In the arrangement shown in FIG. 7, sensitivity to pressure is not reduced. As a result of sensitivity being cut in half, the circuit is more sensitive to spurious signals arising from cross-coupling effects between X, Y and P, though each configuration is sensitive in different ways.

Figure 4:
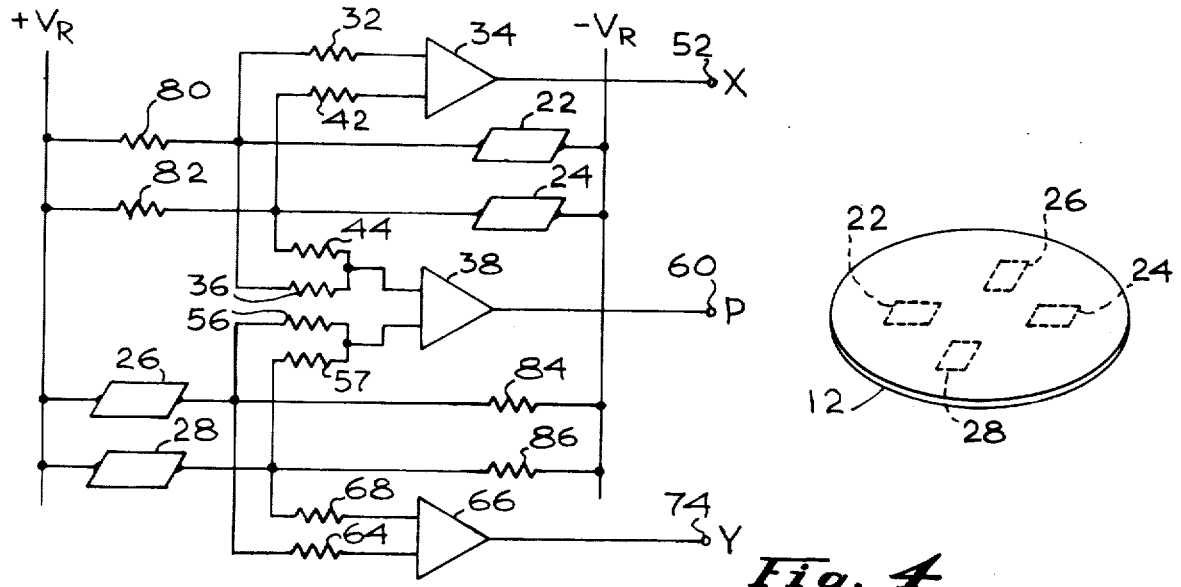
FIGS. 4 through 7 illustrate different strain gauge placements on a diaphragm, in accordance with this invention, as well as simplified configurations of bridge circuits for each strain gauge placement.

In the arrangement shown in FIG. 4, the strain gauges 22, 24, 26, and 28 are all on the bottom side of the diaphragm 12, and are disposed quadrantially around the center of the diaphragm and close to the center.

In the adjacent circuit diagram, circuit components which have functions similar to those shown in FIG. 3 have similar reference numerals applied thereto. It will be seen that in place of strain gauge 21, a resistor 80 is connected between $+V_R$ and the input to amplifier 34. In place of strain gauge 23, a resistor 82 is connected between $+V_R$ and the other input to the amplifier 34. In place of strain gauge 25, a fixed resistor 84 is connected between $-V_R$ and the input to amplifier 38. In place of a strain gauge 27, a fixed resistor 86 is employed in the circuit.

Figure 5:
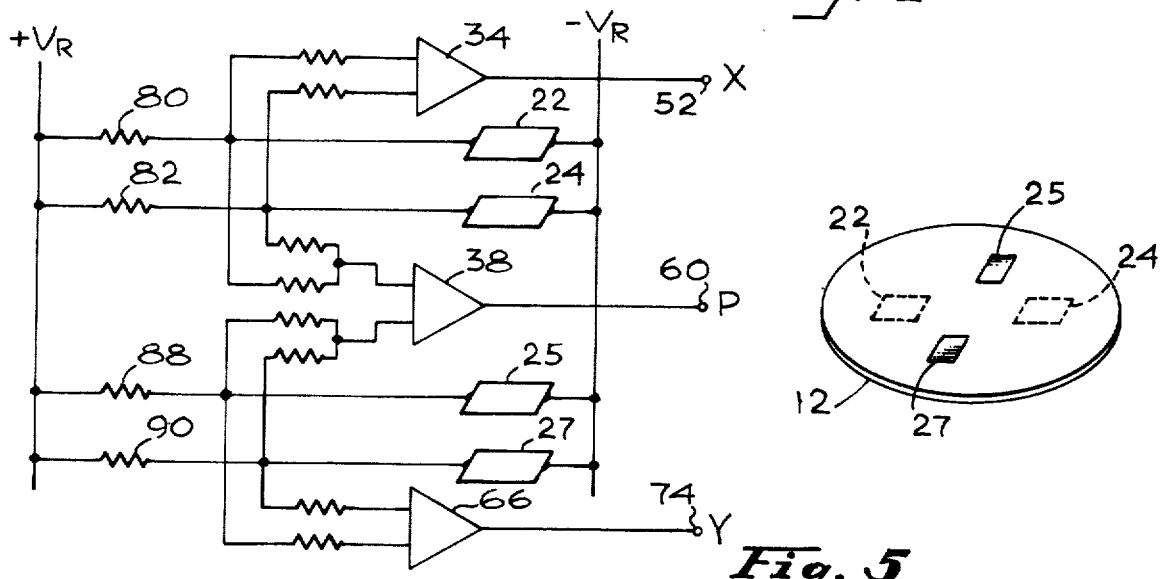

In FIG. 5, two strain gauges, respectively 25 and 27, are mounted on one side of the diaphragm and strain gauges 22 and 24 are mounted on the bottom side of the diaphragm. In the circuit diagram, resistors 80 and 82 take the place of strain gauges 21 and 23 respectively in the bridge circuit and resistors 88 and 90 respectively take the place of strain gauges 26 and 28 in the bridge circuit.

Figure 6:
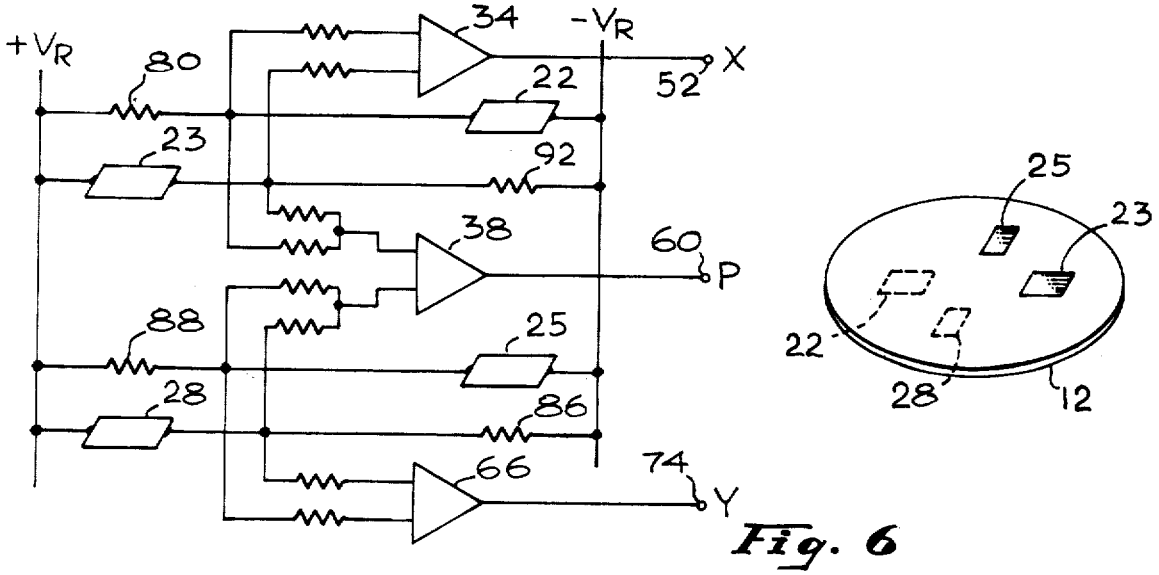

In FIG. 6, strain gauges 23 and 25 are shown on top of the diaphragm 12, orthogonally disposed relative to one another and strain gauges 22 and 28 are attached to the bottom side of the diaphragm also orthogonally disposed relative to one another and on the same diameters of the diaphragm as the respective strain gauges 23 and 25. In the circuit diagram, resistor 80, as before, takes the place of strain gauge 21. Resistor 92 takes the place of strain gauge 24. Resistor 88, as before, takes the place of strain gauge 26 and resistor 86, as before, takes the place of strain gauge 27.

Figure 7:
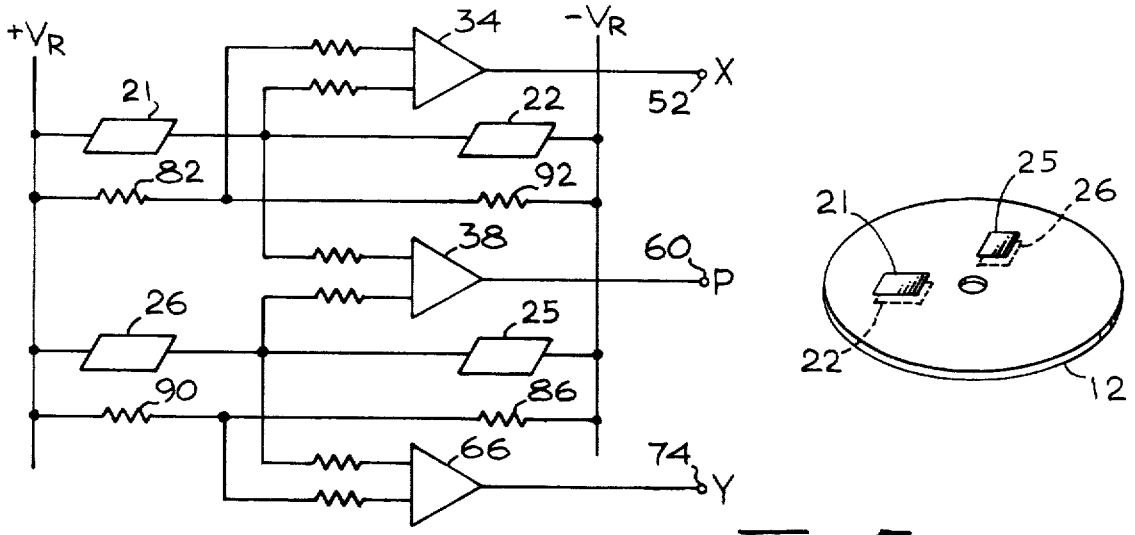

In FIG. 7, strain gauges 21 and 22 are mounted opposite one another on opposite surfaces of the diaphragm 12, and strain gauges 25 and 26 are mounted opposite one another on opposite sides of the diaphragm also. The strain gauges are orthogonally disposed relative to one another. In the circuit diagram, resistor 82 takes the place of strain gauge 23. Resistor 92 takes the place of strain gauge 24. Resistor 90 takes the place of strain gauge 28. Resistor 86 takes the place of strain gauge 27.

Considering the strain gauge arrangements shown in FIGS. 4 through 7, the one shown in FIG. 7 is the worst as far as cross-coupling is concerned. In fact, although it can readily distinguish between the X and Y forces, it is not possible to distinguish between lateral forces and vertical pressure. For example, there would be no way to distinguish a pure pressure force from a pure displacement force at 45°. For a four strain gauge system therefore, the arrangements shown in FIGS. 4, 5 and 6 are better than the ones shown in FIG. 7. The operating characteristics of the arrangements shown in FIGS. 4 and 5 are nominally identical except that the configuration of FIG. 4 is easier to fabricate if the strain gauges are to be deposited simultaneously, because they are all mounted on the same side of the diaphragm. On the other hand, if the gauges are to be individually mounted and wired, the configuration shown in FIG. 5 may be better because there is more working room, in view of the fact that only two gauges are mounted on each side of the diaphragm. Thus, one consideration in deciding which of the four strain gauge arrangements to use depends on the method of fabrication to be used. Of the three configurations shown in FIGS. 4, 5 and 6, those of 5 and 6 are preferred over FIG. 4 in that these arrangements are better balanced with respect to cross-coupling effects and decreased sensitivity of output with respect to thermal drift as well as better behavior of the required bridge circuits against thermal drift.

An arrangement for achieving maximum sensitivity, minimal thermal sensitivity, and best all around response, and therefore the preferred arrangement for this invention is shown in FIG. 8. Eight gauges are deposited simultaneously on the same side of the diaphragm, four gauges are deposited close to the center of the diaphragm and four gauges are deposited close to the outer periphery of the diaphragm, with all gauges being deposited on the same side. It should be noted from FIG. 2 that the polarity of strain in the diaphragm is the same at the inner and outer radii position on opposite sides of the diaphragm. Therefore, if strain gauges 22, 24, 26, and 28 were moved to the top of the diaphragm at the outer radius the same signal outputs are obtained as those derived from the arrangement shown in FIG. 1.

A new arrangement is shown in FIG. 8. Here, strain gauges 21, 23, 25, and 27 are deposited around and close to the center of the diaphragm on quadrantially disposed radii. Strain gauge 26 is deposited on the same side of the diaphragm as strain gauge 25 and on the outer end of the radius passing through strain gauge 25. Straing gauge 24 is attached to the diaphragm also at its top and toward the outer end of the radius which passes through strain gauge 23. Strain gage 28 is deposited on the top of the diaphragm and on the outer end of the same radius which passes through strain gauge 27. Strain gauge 22 is deposited on the top of the diaphragm and on the outer end of the same radius which passes through strain gauge 21. Connections for $+V_R$ and $-V_R$ as well as to the bridge are made from strain gauges 22, 24, 26, and 28. The leads connecting the strain gauges 21, 23, 25, and 27 to the respective strain gauges 22, 24, 26, and 28 are in accordance with the arrangement shown in the schematic diagram in FIG. 3. Using large scale integration techniques, it is possible to deposit substantial portions of the bridge circuit on the diaphragm also without impeding its response to pen motion thereby considerably reducing noise and other pickup problems.

In the embodiment of the invention shown herein, strain gauges are used in a bridge configuration rather than in a single configuration to sense the pen force signals. There are good reasons for doing this. Foil strain gauges of the type designated are designed to have a temperature coefficient of zero, when bonded to a specified substrate material. The temperature coefficient is zero only for small temperature excursions about a specified temperature, (usually 75° F). Larger temperature changes will be reflected in the electrical outputs as errors. In addition, since strain gauges are resistive devices, they must dissipate power, which in turn raises their temperature. When the gauges are unstressed, the power dissipated in each gauge and therefore the temperature rise in each gauge will be equal. However, under dynamic conditions, such as are experienced during writing with the pen, the gauges are stressed and therefore the power dissipation and temperature rise of the gauges are no longer equal. By using the gauges in the bridge configuration and bonding them to a common substrate, these temperature change effects are canceled and therefore are not reflected in the outpput signal. Thus, the bridge configuration of the strain gauges is necessary for accurate strain to voltage conversion.

It should be noted that the strain gauges produce an output indication of X and Y motions only if the pen is properly orientated to that motion toward or away from the writer results in excitation of the Y strain gauges only and left and right motion excites only the X strain gauges. An arrangement for allowing this is shown in FIG. 1 of the U.S. Pat. No. 3,145,367 whereby the barrel of the pen which is grasped by the hand makes an angle with the housing portion of the pen which holds the ballpoint ink cartridge so that it is always positioned vertically with respect to the writing surface and also allows the housing to assume the proper rotational angle to the writing plane so that correct signals will be generated in response to writing motions.

Besides the utility of the diaphragm and strain gauge arrangement described herein as a signal generator for directions of motion of a writing instrument, appreciation should also be had of the fact that what has been described is effectively a transducer for generating signals responsive to the deflection of a rod which is attached to the center of the diaphragm. Such a transducer can find utility, for example, in a wind tunnel into which an end of the rod is inserted, adjacent a surface being tested in the wind tunnel. The transducer can then indicate the force of the wind adjacent the surface as well as the direction from which it is coming. Also, by immersing the end of the rod in a fluid, other than air, the effect of the pressure being exerted by the fluid as well as the direction in which it is moving can be derived from the outputs from the strain gauges attached to the diaphragm.

While the diaphragm shown in the drawings herein has the form of a complete circle, it will be understood that this is an exemplary structure. The omission of sectors of the diaphragm circle or the use of cross beams in place of the circular diaphragm consistutes an equivalent structure which comes within the scope of the claims herein in reciting diaphragm means.

The embodiments of the invention in which an exclusive property a priviledge is claimed are defined as follows:

1. Apparatus for generating signals representative of the force on and direction of motion of one end of a shaft comprising flexible diaphragm means, means for supporting said flexible diaphragm means at its periphery, means for attaching said shaft to said flexible diaphragm means at a location spaced from said one end to cause strain within said diaphragm responsive to force on and motion of said one end of said shaft, a plurality of strain gauge means attached to at least one surface of said flexible diaphragm means and disposed around the location on said flexible diaphragm to which said shaft is attached for generating signals representative of the strains within said diaphragm, and circuit means for combining said strain gauge means signals for producing signals representative of the forces on and direction of motion of said one end of said shaft, including a bridge circuit including means for combining output signals from strain gauges which lie along a first line passing through said location on said diaphragm for producing a resultant signal representative of the force on one end of said shaft along one axis, means for combining output signals from strain gauges which lie along a second line intersecting at right angles with said first line at said location on said diaphragm for producing a resultant signal representative of the force on said one end of said shaft along a second axis, and means for combining all of the signals from said strain gauges for producing an output signal representative of the axial force on said one end of said [rod] *shaft.*

2. Apparatus for generating signals representative of the force and direction of motion of a writing instrument used for writing, comprising a shaft having writing means at one end thereof, flexible diaphragm means, means for attaching said shaft to said flexible diaphragm means at a location spaced from said one end to cause strains within said diaphragm responsive to pressure on and motion of said writing means, means for supporting said diaphragm by its periphery with said writing means extending from one end thereof, a plurality of strain gauge means attached to at least one surface of said flexible diaphragm means and disposed around the location on said flexible diaphragm to which said shaft is attached for generating signals representative of the strains within said diaphragm, and circuit means for combining said strain gauge means signals for producing signals representative of the force on and direction of motion of said writing means.

3. Apparatus as recited in claim 2 wherein said plurality of strain gauge means comprise eight strain gauges two of which are positioned on one surface of said flexible diaphragm means on opposite sides of the location to which said shaft is attached and on a first line passing therethrough, another two of said strain gauges are positioned on said one surface of said flexible diaphragm means on opposite sides of the location to which said shaft is attached and on a line passing therethrough and at a right angle to said first line, and the remaining four of said eight strain gauges being attached to the surface opposite said one surface of said flexible diaphragm means and opposite to the location to which said first four of said eight strain gauges are attached.

4. Apparatus as recited in claim 2 wherein said plurality of strain gauge means comprises eight strain gauges all of which are attached to one surface of said diaphragm, a first four of which are positioned symmetrically on either side of the location to which said shaft is attached and along a first line passing therethrough, and the remaining four of said strain gauges being positioned symmetrically on either side of the location to which said shaft is attached and along a second line which passes therethrough and is orthogonal to said first line.

5. Apparatus for generating signal as recited in claim 2 wherein said plurality of strain gauge means comprises four strain gauges attached to one surface of said flexible diaphragm means and symmetrically disposed about said location which said shaft is attached.

6. Apparatus for generating signals as recited in claim 2 wherein said plurality of strain gauge means comprises four strain gauges, a first two of which are attached to one surface of said flexible diaphragm means, and a second two of which are attached to the opposite surface of said flexible diaphragm means.

7. Apparatus as recited in claim 2 wherein said circuit means comprises a bridge circuit including means for combining output signals from strain gages which lie along a first line passing through said location on said diaphragm for producing a resultant signal representative of the direction of motion of one end of said shaft along one axis, means for combining output signals from said gauges which lie along a second line intersecting at right angles with said first line at said location on said diaphragm for producing a resultant signal representative of the direction of motion of said one end of said shaft along a second axis, and means for combining all of the signals from said strain gauges for producing an output signal representative of the axial motion of said one end of said shaft.

*8. Apparatus for generating signals representative of the force on and direction of motion of one end of a shaft comprising*

*flexible diaphragm means,*

*means for supporting said flexible diaphragm means,*

*means for coupling said shaft to said flexible diaphragm means at a location spaced from said one end to cause strain within said diaphragm responsive to force on and motion of said one end of said shaft,*

*a plurality of strain gauge means attached to at least one surface of said flexible diaphragm means and disposed at locations on said flexible diaphragm to which said shaft is coupled for generating signals representative of the strains within said diaphragm, and*

*circuit means for combining said strain gauge means signals for producing signals representative of the forces on and direction of motion of said one end of said shaft, including*

*a bridge circuit including means for combining output signals from strain gauges which are representative of strain along a first direction on said diaphragm and for producing a resultant signal representative of the force on one end of said shaft along one axis,*

*means for combining output signals from strain gauges which are representative of strains which lie along a second direction on said diaphragm and for producing a resultant signal representative of the force on said one end of said shaft along a second axis, and*

*means for combining all of the signals from said strain gauges for producing an output signal representative of the axial force on said one end of said shaft.*

*9. Apparatus for generating signals representative of the force on and direction of motion of a writing instrument used for writing, comprising*

*a shaft having writing means at one end thereof,*

*flexible diaphragm means,*

*means for coupling said shaft to said flexible diaphragm means at a location spaced from said one end to cause strains within said diaphragm responsive to pressure on and motion of said writing means,*

*supporting means for supporting said flexible diaphragm means with said writing means spaced from said supporting means,*

*a plurality of strain gauge means attached to at least one surface of said flexible diaphragm means and disposed at locations on said flexible diaphragm to which said shaft is coupled for generating signals representative of the strains within said diaphragm, and*

*circuit means for combining said strain gauge means signals for producing signals representative of the force on and direction of motion of said writing means.*

* * * * *